(12) United States Patent
Stone

(10) Patent No.: US 10,116,754 B2
(45) Date of Patent: Oct. 30, 2018

(54) DYNAMIC CONFIGURATION OF INTERFACE IDENTIFIERS

(71) Applicant: Comcast Cable Communications, LLC, Philadelphia, PA (US)

(72) Inventor: Christopher Stone, Newtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 262 days.

(21) Appl. No.: 14/168,241

(22) Filed: Jan. 30, 2014

(65) Prior Publication Data

US 2015/0215278 A1 Jul. 30, 2015

(51) Int. Cl.
*G06F 15/16* (2006.01)
*H04L 29/08* (2006.01)
*H04L 12/24* (2006.01)
*H04L 29/12* (2006.01)

(52) U.S. Cl.
CPC ........ *H04L 67/146* (2013.01); *H04L 41/0806* (2013.01); *H04L 61/2038* (2013.01); *H04L 61/6022* (2013.01)

(58) Field of Classification Search
CPC ... H04L 67/146; H04L 12/14; H04L 61/2038; H04L 61/6022
See application file for complete search history.

(56) References Cited

U.S. PATENT DOCUMENTS

| | | | | |
|---|---|---|---|---|
| 6,430,635 B1 * | 8/2002 | Kwon | ............... | H04L 12/40052 375/E7.019 |
| 6,801,777 B2 * | 10/2004 | Rusch | ................... | H04W 48/18 455/450 |
| 7,415,535 B1 * | 8/2008 | Kuik | ................... | H04L 61/6004 370/217 |
| 8,244,916 B1 * | 8/2012 | Loc | ..................... | H04L 12/6418 709/220 |
| 8,750,188 B2 * | 6/2014 | Nicoara | ................ | H04W 48/18 370/252 |
| 9,075,978 B2 * | 7/2015 | Schneider | ............. | G06F 21/572 |
| 9,191,874 B2 * | 11/2015 | Marmolejo-Meillon | .................... | H04W 4/00 |
| 2003/0105881 A1 * | 6/2003 | Symons | .................. | H04L 29/06 709/249 |
| 2005/0044273 A1 | 2/2005 | Bouchat et al. | | |
| 2005/0060425 A1 * | 3/2005 | Yeh | ..................... | H04L 12/2856 709/232 |
| 2005/0141469 A1 | 6/2005 | Miller et al. | | |
| 2006/0221846 A1 | 10/2006 | Dyck et al. | | |
| 2007/0019609 A1 | 1/2007 | Anjum | | |
| 2008/0175246 A1 * | 7/2008 | Kunhappan | ....... | H04L 29/12254 370/392 |
| 2011/0067089 A1 * | 3/2011 | Allard | ................... | H04L 63/164 726/3 |

(Continued)

*Primary Examiner* — Viet D Vu
(74) *Attorney, Agent, or Firm* — Banner & Witcoff, Ltd.

(57) ABSTRACT

Dynamic configuration of identifiers of a computing device is described. A computing device may assign identifiers to interfaces, and may send one or more requests through one or more of the interfaces to access a network. A response to the request may be analyzed to determine whether it includes a code that the device understands to be from the network. If the response did not include such a code, the device may determine whether to re-assign the identifier currently assigned to a primary or default interface to another interface of the multiple interfaces.

20 Claims, 7 Drawing Sheets

(56) References Cited

U.S. PATENT DOCUMENTS

| | | | | |
|---|---|---|---|---|
| 2012/0117590 A1* | 5/2012 | Agnihotri | ........ | H04N 21/25816 725/30 |
| 2012/0311166 A1* | 12/2012 | Garcia, Jr. | ............ | H04W 48/18 709/228 |
| 2013/0152147 A1* | 6/2013 | Toney, Jr. | .......... | H04N 21/4722 725/110 |

* cited by examiner

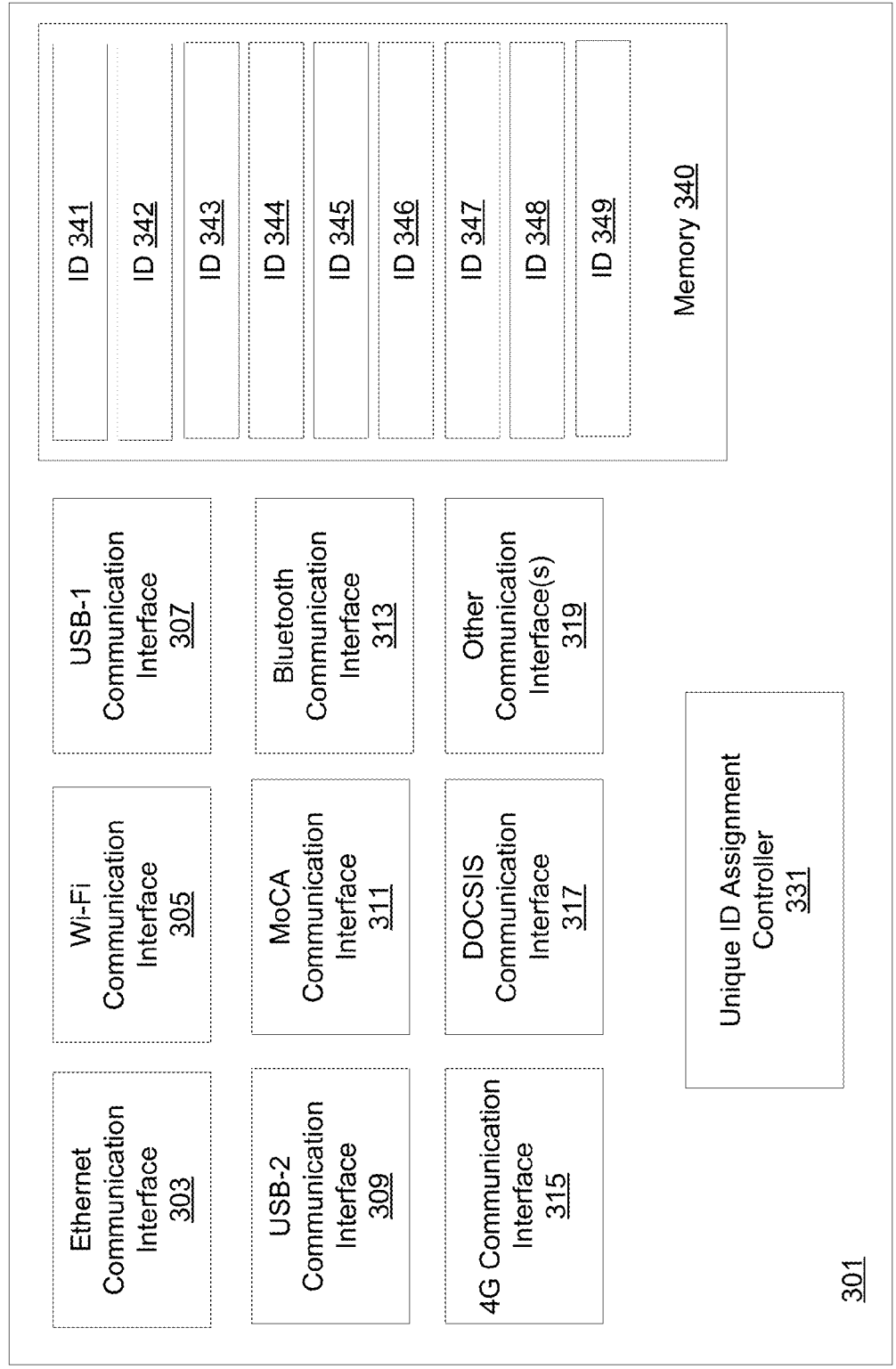

DYNAMIC CONFIGURATION OF INTERFACE IDENTIFIERS

BACKGROUND

Providers operating a computer network environment often utilize and/or deploy products (e.g., modems, routers, gateways, set top boxes, etc.) where the device's identifier (ID) (e.g., MAC address, serial number, etc.) is used to provision the device in a network. Legacy devices often had only one network communication interface that was used to communicate with a provisioning system. In such cases, the device ID (e.g., MAC address) was fixed and never changed, which can create problems if the device later uses a different interface (having a different address), e.g., to make a purchase or handle data. Improvements in the manner in which content is distributed and provided to the user are always in demand.

Conventional systems may employ a system where each network interface is assigned a dedicated device ID (e.g., a MAC address). Such a model is problematic, for example, when initially deploying a device with multiple network communication interfaces. When provisioning using one network interface of the plurality, the device ID for the interface would be used by a corresponding system for access. Should a need exist to re-deploy the device and now utilize a different interface, the previous device ID is no longer valid since it is associated with a different interface. Thus, improvements are needed to configure devices and interfaces.

SUMMARY

Network devices may include multiple network communication interfaces that are not fixed. For example, such devices may include two, three, or more potential network communication interfaces that may be used for accessing data through different networks.

Where a device is deployed in a home, for example, using one interface and at some point in the future the interface is switched (e.g., started as multimedia over coax (MoCA), but is switched to Wi-Fi), the device would have to be removed from the provider's systems (e.g., billing) and re-entered with a new ID for the new interface being used. For a device that needs such an adjustment in a user's home, the result could be a disruption of service due to deleting and re-adding a device in a user's account, and may require user interaction.

Some aspects of the present disclosure are directed to systems and method for autonomous configuration of a device identification (ID). Devices with multiple communication interfaces (e.g., for multiple types of networks) may have unique identifiers assigned to the communication interfaces. When provisioning the device by or to a service provider, such as a television content provider, the device may send a request through a primary or default communication interface. The request to access the service provider network includes the unique identifier of the communication interface. A response to the request may be analyzed to determine whether it includes a code that the device understands to mean that the response is from the service provider network. Analysis of the response to the request may include a comparison of the received code to a predetermined code (expected). If the response includes such a code that matches or aligns with the predetermined code, the device can access the service provider network through the primary or default communication interface. Alternatively, if the response did not include the code that matches or aligns with the predetermined code, the device may determine whether to re-assign the unique identifier currently assigned to the primary or default communication interface to another communication interface of the multiple communication interfaces.

In accordance with another aspect of the present disclosure, a device may send multiple requests through multiple communication interfaces to seek access to a particular service provider network. In such a case, each request through a particular communication interface includes the unique identifier for that communication interface. Upon receipt of a response from the service provider network that includes a code that the device understands is from the service provider network, the device can re-assign, if necessary, the unique identifier for one or more of the communication interfaces of the device accordingly.

In accordance with still another aspect of the present disclosure, as a device is in operation and accessing a service provider network through a particular communication interface, a condition may arise where the particular communication interface is no longer in operation and/or another communication interface to access the service provider network is needed. In such a situation, the device may automatically re-assign one or more of the unique identifiers of the communication interfaces. As the service provider network expects to see a particular unique ID for an account of the user associated with the device, the particular unique ID may be re-assigned to a different communication interface that can access the service provider network.

In other aspects, a device may include a plurality of communication interfaces and a plurality of unique identifiers that can be assigned to the communication interfaces. A service provider network expecting a particular unique identifier for access purposes may allow access to the device through different communication interfaces, depending on conditions, so long as the particular unique identifier is being used for access purposes. Accordingly, since the device has the capability to assign and re-assign the unique identifier associated with the communication interfaces, access to the service provider network may always be achieved so long as one communication interface of the device is operational.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 3 illustrates an example computing device in accordance with aspects of the present disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
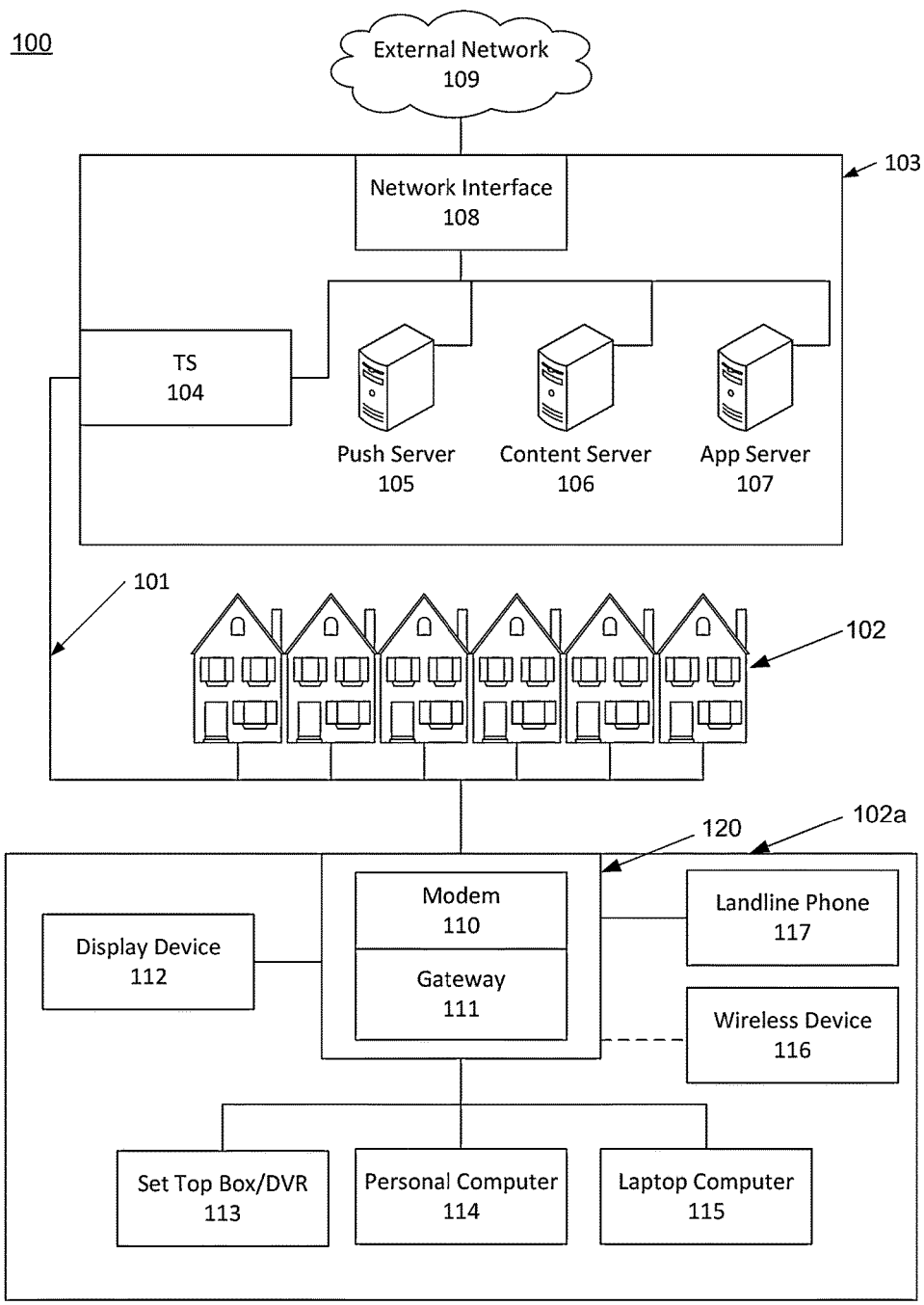
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, and/or a hybrid fiber/coax distribution network. Network 100 also may include multiple types of networks (e.g., Wi-Fi 802.11a-n, Ethernet, 3G, 4G, and 4GLTE) that interconnect. Such networks 100 use a series of interconnected communication links 101 (e.g., coaxial cables, optical fibers, wireless, etc.) to connect multiple premises 102 (e.g., businesses, homes, consumer dwellings, etc.) to a local office or head end 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Still another application server 107 may be responsible for tracking and collecting billing data associated with various premises 102 equipment. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
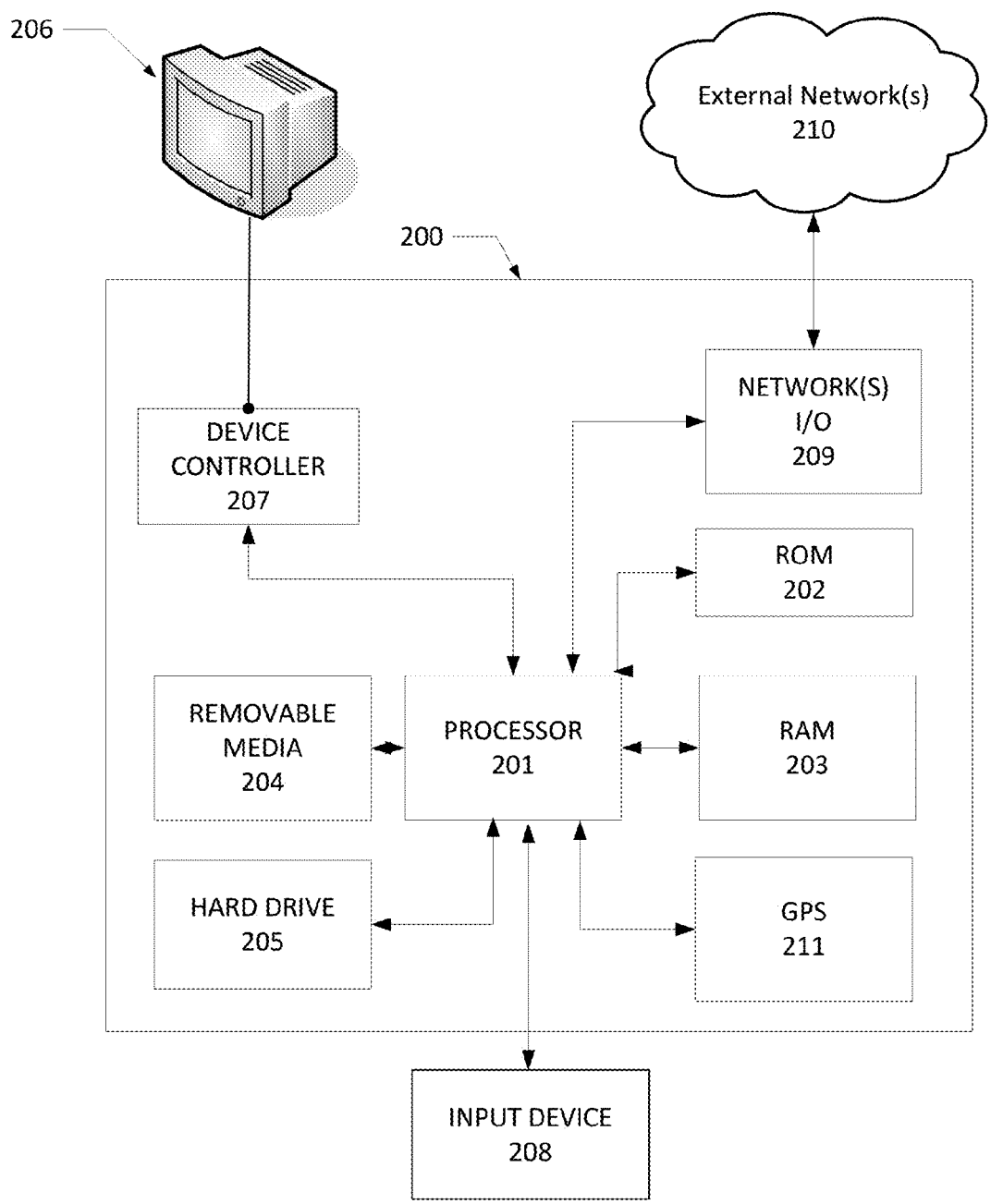
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

FIG. 3 illustrates an example computing device 301 in accordance with aspects of the present disclosure. Computing device 301 may be a gateway, such as gateway 111, a set-top box, such as set-top box 113, a digital video recorder, and/or other computing device, such as computing device 200. Although the examples included herein describe a cable system where an user desires to access audio and/or video content from a cable head end of the cable service provider network, aspects of the present disclosure described herein may be utilized in other configurations and/or computing environments. For example, an Internet service provider may have digital modems with multiple communication interfaces included therein for accessing the Internet through the Internet service provider's network. In other examples, car service stations may have a computing environment for accessing databases and other content of multiple car manufacturers. The computing device for accessing these car manufacturer networks may include a multiple communication interfaces.

Within computing device 301, memory 340 may maintain a plurality of identifiers (341-349) that are to be associated with communications interfaces (303, 305, 307, 309, 311, 313, 315, 317, and 319) of the computing device 301. Memory 340 may be any of a number of types of memory, such as ROM 202, RAM 203, removable media 204, and/or a hard drive 205. The IDs may be unique IDS, such as Media Access Control (MAC) addresses, serial numbers, interface part numbers, and/or some other type of identification. The IDs 341-349 are assigned individually to the communication interfaces of the computing device 301. In FIG. 3, computing device 301 includes a plurality of communication interfaces for accessing networks external to the computing device 301. The communication interfaces 303, 305, 307, 309, 311, 313, 315, 317, and 319 are illustrative and fewer or more combinations of communication interfaces may be included within computing device 301.

In the illustrative example of FIG. 3, computing device 301 includes an Ethernet communication interface 303, a Wi-Fi communication interface 305, two separate USB communication interfaces 307 and 309, a MoCA communication interface 311, a Bluetooth communication interface 313, a 4G communication interface 315, and a DOCSIS communication interface 317. Other communication interface(s) 317 may include an 802.11ad (Wi-Fi in 60G spectrum) communication interface, other telecom network interfaces (e.g., edge network, 3G, 4GLTE), fiber optical interface technologies (e.g., Fiber Distributed Data Interface (FDDI), an 802.3 network interface, an 802.11au network interface, and an 802.11 ae network interface. Other types of communication interfaces to a type of network are included herein. One or more communication interfaces may be physical interfaces, logical interfaces, and/or a combination of them.

The plurality of IDs 341-349 that are maintained in memory 340 of computing device 301 may have been originally stored by a manufacturer of the computing device 301. The IDs 341-349 are designed to be interchangeably assigned to the communication interfaces 303, 305, 307, 309, 311, 313, 315, 317, and 319 of computing device 301. As described herein, a single ID, such as ID 341, is assigned to a particular communication interface, such as MoCA communication interface 311. Each communication interface has a corresponding ID assigned and/or re-assigned to it in accordance with one or more features described herein.

A unique ID assignment controller 331 is included in computing device 301. Unique ID assignment controller 331 may be included within one or more of processor 201, ROM 202, RAM 203, removable media 204, and/or hard drive 205. Unique ID assignment controller 331 may be configured to assign and/or re-assign unique IDs from the plurality of IDs 341-349 maintained in memory 340 to communication interfaces 303, 305, 307, 309, 311, 313, 315, 317, and 319 as needed. One or more aspects of unique ID assignment controller 331 may be software that is implemented as a particular condition arises, such as when a communication interface of computing device 301 is no longer operational or when computing device 301 is initially provisioned into operation.

During provisioning of computing device 301, unique ID assignment controller 331 may assign the ID 341-349 in memory 340 to communication interfaces 303, 305, 307, 309, 311, 313, 315, 317, and 319 in a number of manners. A default methodology may be implemented where the first ID listed in a memory, such as ID 341 in memory 340, is a primary or default ID. Similarly, the unique ID assignment controller 331 may treat a certain communication interface, such as Ethernet communication interface 303, as a primary or default first communication interface that is assigned the primary or default ID, such as ID 341 in this example. Thereafter, the unique ID assignment controller 331 may assign the other IDs in memory 340 to the other communication interfaces similarly.

In other scenarios, the unique ID assignment controller 331 may only assign IDs to active communication interfaces, e.g., those communication interfaces that are actually connected to a network. For example, if no coaxial connection exists to MoCA communication interface 311, the unique ID assignment controller 331 may not assign one of the IDs in memory 340 to the MoCA communication interface. Thereafter only when a connection to MoCA communication interface 311 exists will the unique ID assignment controller 331 assign or re-assign an ID in memory 340 to the MoCA communication interface 311. In still other scenarios, whether connections exists or do not exist, the unique ID assignment controller 331 may assign or re-assign IDs to the various communication interfaces.

During operation, a condition may arise in which the unique ID assignment controller 331 may re-assign one or more IDs maintained in memory 340 to one or more communication interfaces 303, 305, 307, 309, 311, 313, 315, 317, and 319. For example, as described herein computing device 301 may be accessing a service provider network through a first communication interface, such as Wi-Fi communication interface 305. Upon an occurrence of a condition, such as an operational problem with the Wi-Fi network, interference, and/or disconnection of the service provider network through the Wi-Fi network, the unique ID assignment controller 331 may operate to re-assign the ID currently assigned to the Wi-Fi communication interface 305 to another communication interface, such as 4G communication interface 315, that can access the service provider network. Since the service provider network may be configured to allow access through a communication interface with an allowed ID, the unique ID assignment controller 331 re-assigns the allowed ID that was associated with Wi-Fi communication interface 305 to 4G communication interface 315. In operation computing device 301 can assign and re-assign IDs to different communication interfaces of the computing device without the need for service by a user and/or a service technician.

Figure 4A:
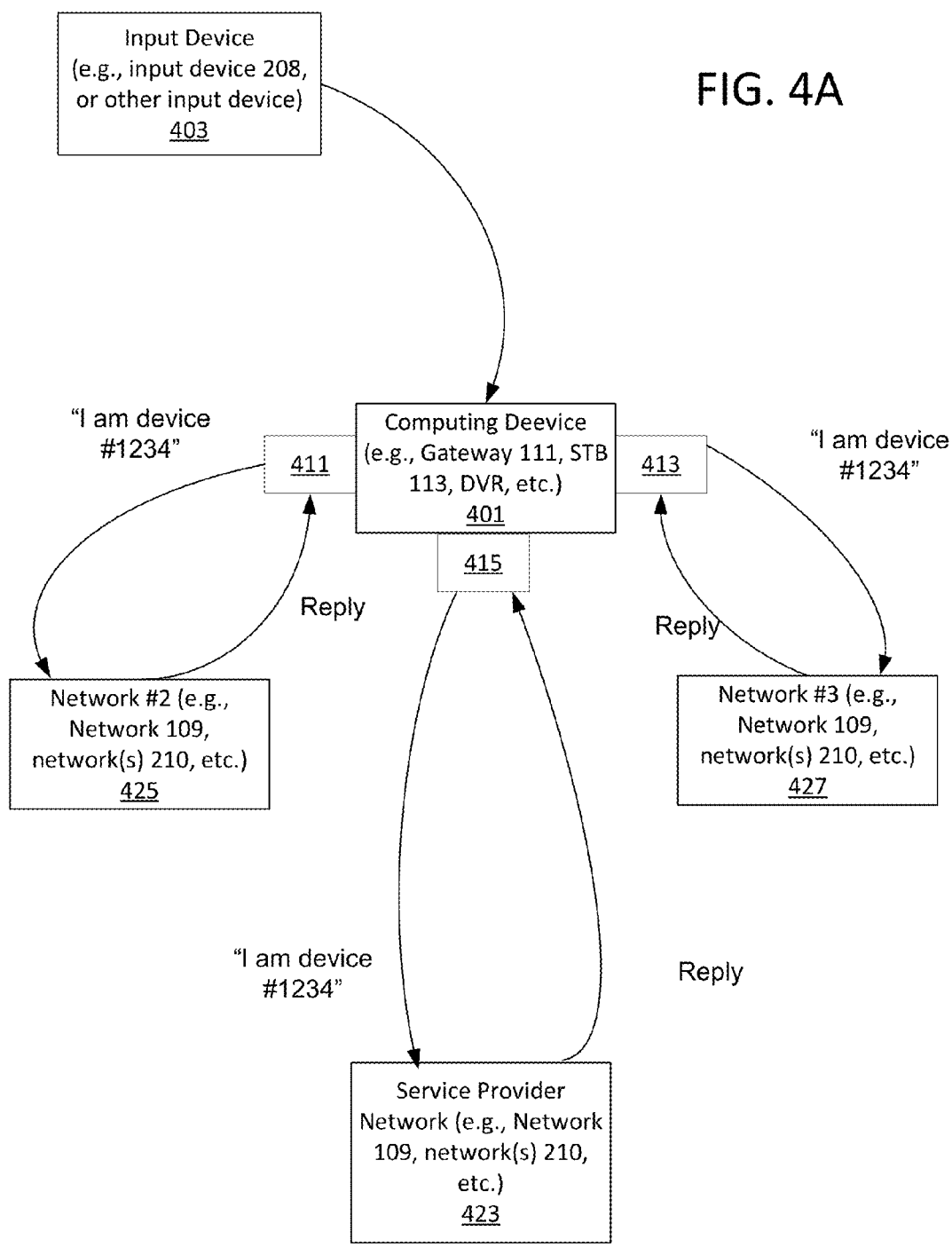
FIGS. 4A-4B illustrate example environments in which aspects of the present disclosure may be implemented.

FIG. 4A illustrates an example environment in which aspects of the present disclosure may be implemented As shown in FIG. 4A, a computing device 401, which may comprise computing device 301, may send and receive data from a number of sources. Computing device 401 may receive input data from an input device 403. Input device 403 may be a keyboard, mouse, remote control, sensor and/or other type of input device, such as input device 208. In some examples, a user may seek to access a video on demand (VOD) database in order to search for and order a movie to watch on a television in the user's home, such as in premises 102. By way of a remote control, such as input device 403, the user can communicate with computing device 401, such as a set-top box 113 or gateway of the user, to seek access to the VOD database.

The desired VOD database (or another content source) may be located within a service provider network 423 and the computing device 401 may be configured to request and receive access to the service provider network 423. Service provider network 423 may comprise network 109, network(s) 210, and/or other networks. Service provider network 423 also may be a conditional access system. By provisioning the computing device and/or by default, a unique ID may be assigned to the communication interface 415 through which access to the service provider network 423 may be sought. In the example of FIG. 4A, computing device 401 initially may not know which communication interface between communication interfaces 411, 413, and 415 is accessible to or by the service provider network 423. Accordingly, computing device 401 may send separate requests through each communication interface 411, 413, and 415 to request access to the service provider network 423.

When computing device 401 sends a request for access to a network through a particular communication interface, such as communication interface 411, 413, and/or 415, the request comprises the unique ID assigned to the communication interface. For example, computing device 401 may have assigned ID 341 to communication interface 411, ID 342 to communication interface 413, and ID 343 to communication interface 415. Communication interface 411 may be the primary or default communication interface of the computing device 401 for attempting to access service provider network 423. In a first scenario, computing device 401 sends a request to access service provider network 423 through communication interface 411. The request includes the ID 341. Such a request may be data representative of the computing device indicating that "I am device #1234." Because communication interface 411 is not configured to access service provider network 423, a reply may be received from the network #2 (425) which the communication interface 411 of computing device 401 is connected.

Such a reply might not include a code that informs the computing device 401 that it is accessing the service provider network 423. A comparison of the code in the reply may not match or align with a predetermined code that informs the computing device that it is accessing the service provider network 423. Accordingly, computing device 401 may re-assign the ID 341 to communication interface 413. In some embodiments the computing device may re-assign the ID 342 that was assigned to communication interface 413 to communication interface 411 since communication interface now has been assigned ID 341. Having re-assigned ID 341, computing device may repeat the process of sending a request to access service provider network 423 through communication interface 413. The request includes the ID 341. Again, such a request may be data representative of the computing device indicating that "I am device #1234." Because communication interface 413 is not configured to access service provider network 423, a reply may be received from the network #3 (427) which the communication interface 413 of computing device 401 is connected.

Once again in this example, such a reply does not include a code that informs the computing device 401 that it is accessing the service provider network 423. Accordingly, computing device 401 again may re-assign the ID 341 to communication interface 415. Having re-assigned ID 341, computing device may repeat the process of sending a request to access service provider network 423 through communication interface 415. The request includes the ID 341. Again, such a request may be data representative of the computing device indicating that "I am device #1234." Because communication interface 415 is configured to access service provider network 423, a reply may be received from the service provider network 423 which communication interface 415 of computing device 401 is connected. In this example, the reply includes a code that informs the computing device 401 that it is accessing the service provider network 423. Such a code may be some form of data that the computing device can determine from a reply message it receives to its request for access that the desired service provider network 423 may be accessed through that particular communication interface. For example, the code in the reply may match or align with a predetermined (expected) code that indicates that the reply is from the service provider network 423.

Computing device 401 now may access the service provider network 423 as needed through communication interface 415. In this example a billing system associated with the service provider network 423 may have an account number of the user that is matched to ID 341. Because the computing device is accessing the service provider network 423 through communication interface 415 which is assigned ID 341, such a billing or tracking system of the service provider network 423 can note any such access to the network 423 by the computing device 401 accordingly.

In yet another example scenario with respect to FIG. 4A, computing device 401 may have assigned ID 341 to communication interface 411, ID 342 to communication interface 413, and ID 343 to communication interface 415. Communication interface 411 may be the primary or default communication interface of the computing device 401 for attempting to access service provider network 423. Computing device 401 sends a separate request to access service provider network 423 through each communication interface 411, 413, and 415. The request includes the ID assigned to that communication interface.

In this example, because communication interfaces 411 and 413 are not configured to access service provider network 423, separate replies are received from the network #2 (425) which communication interface 411 is connected, from the network #3 (427) which communication interface 413 is connected, and from service provider network 423 which communication interface 415 is connected. For the replies from network #2 (425) and network #3 (427), such a reply might not include a code that informs the computing device 401 that it is accessing the service provider network 423. However, because communication interface 415 is configured to access service provider network 423, a reply is received from the service provider network 423 which communication interface 415 is connected. In this example, the reply includes a code that informs the computing device 401 that it is accessing the service provider network 423 through communication interface 415.

Accordingly, since ID 341 may be the ID that is used by a billing and/or tracking system of the service provider network, computing device 401 may re-assign the ID 341 to communication interface 415. In some embodiments computing device may re-assign the ID 343 that was assigned to communication interface 415 to communication interface 411 since communication interface 415 now has been assigned ID 341. In another embodiment, computing device may re-assign the ID 342 that was assigned to communication interface 413 to communication interface 413 and may re-assign the ID 343 that was assigned to communication interface 415 to communication interface 413.

Figure 4B:
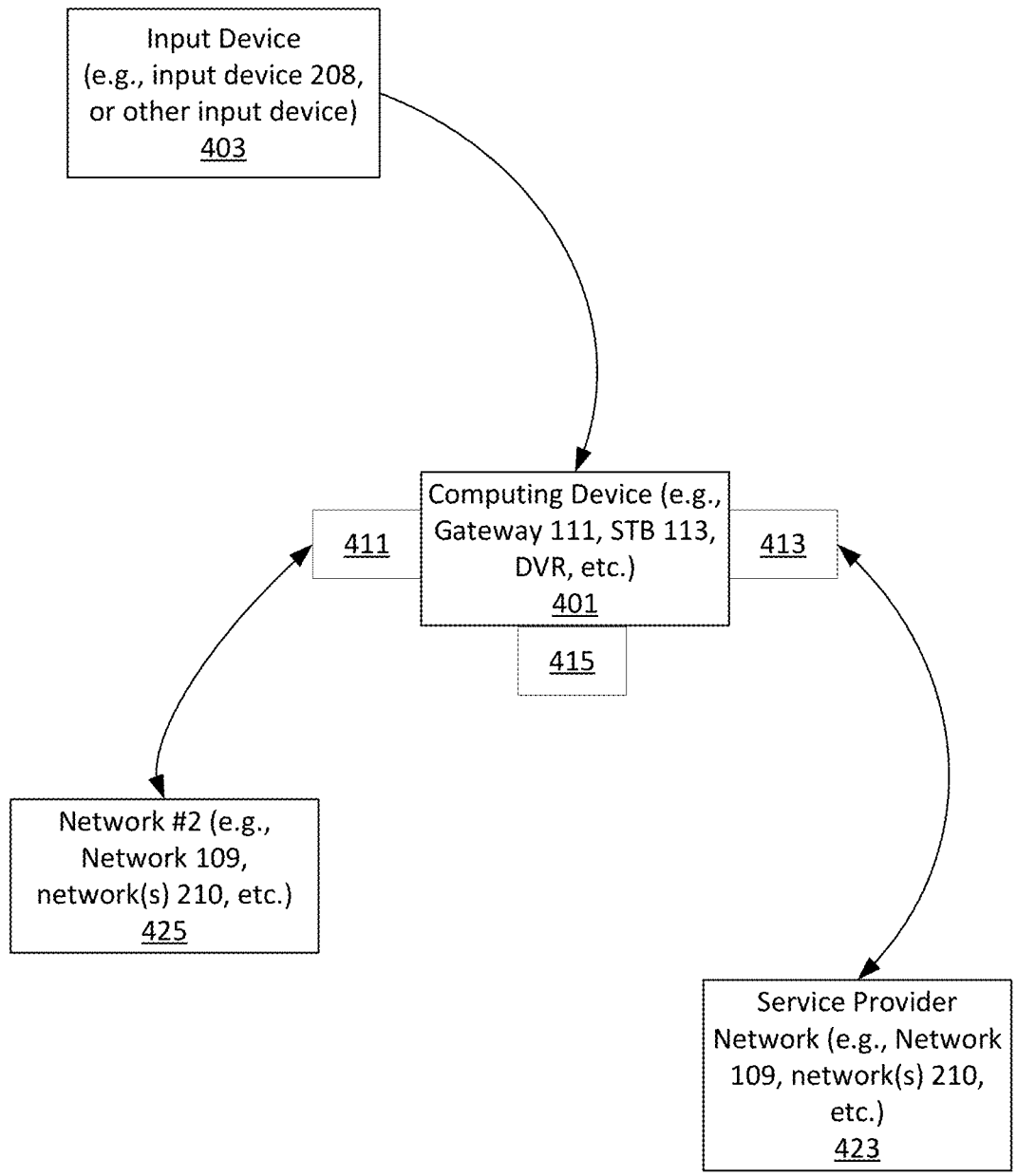

FIG. 4B illustrates another example environment in which aspects of the present disclosure may be implemented. In this example, computing device 401 may have been accessing the service provider network 423 through communication interface 415 as shown in FIG. 4A. However, due to a condition, such as interference through communication interface 415, better performance through another communication interface, operational error of communication interface 415, physical disconnection of a link to service provider network 423, and/or some other type of condition that no longer warrants desired access to service provider network 423, access to the service provider network 423 changes.

In the example of FIG. 4B, communication interface 415 may be a MoCA communication interface, such as MoCA communication interface 311. In FIG. 4B, someone may have removed the coaxial cable connection at communication interface 415 and thus a connection to service provider network 423 through communication interface 415 no longer exists. Computing device 401 may dynamically change the unique IDs associated with the communication interfaces 411, 413, and/or 415 accordingly.

Whether sending separate requests through each communication interface 411 and 413 or sending through one, waiting for a response, and then determining whether to send through another, computing device 401 eventually receives a reply from the service provider network 423 which the communication interface 413 of computing device 401 is connected. Accordingly, since ID 341 may be the ID that is used by a billing and/or tracking system of the service provider network, and this ID had been assigned to communication interface 415 since access to the service provider network 423 occurred though it prior to the condition, computing device 401 may re-assign the ID 341 to communication interface 413. In some embodiments computing device may re-assign the unique ID that was assigned previously to communication interface 413 to communication interface 415 since communication interface 413 now has been assigned ID 341.

Figure 5:
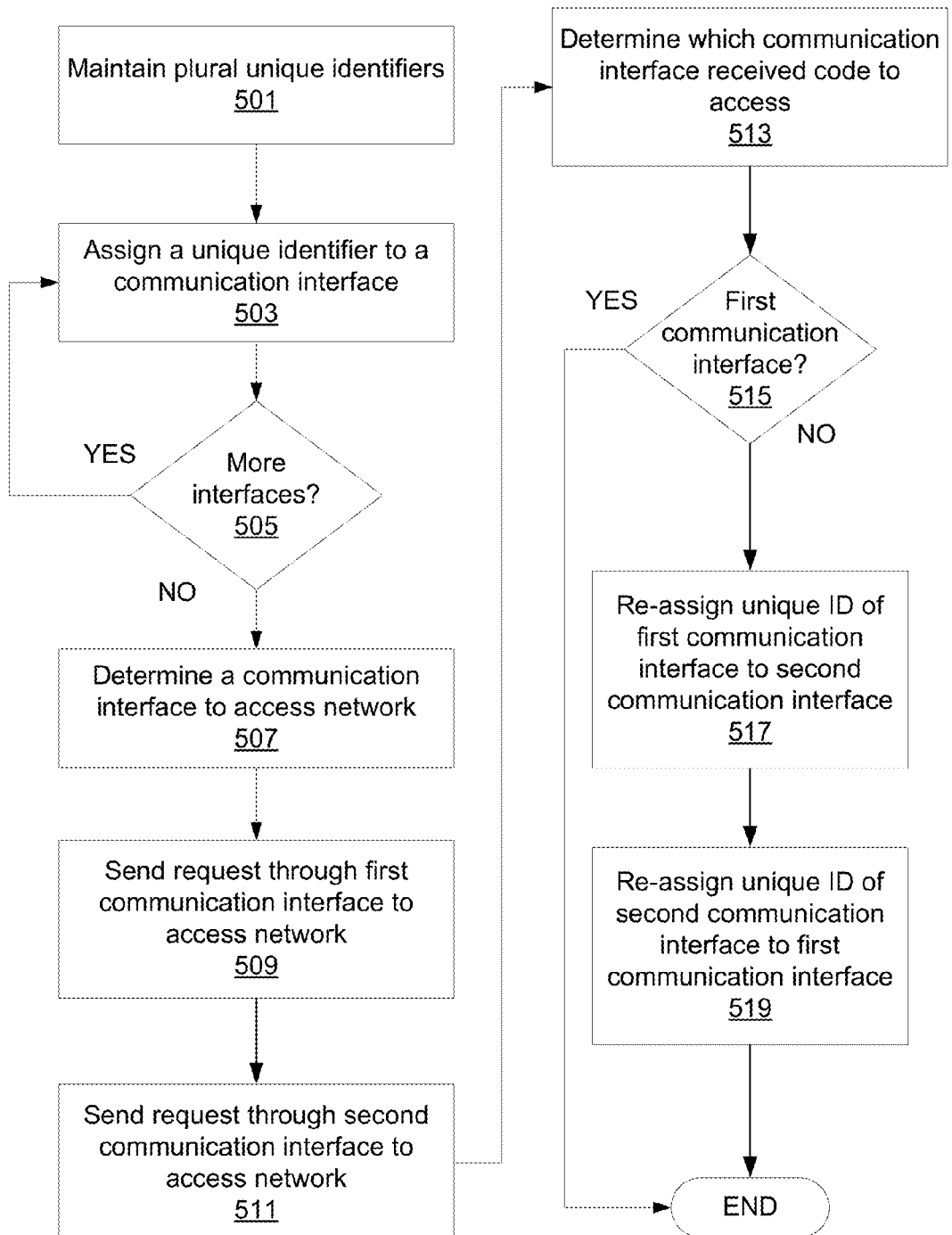
FIG. 5 illustrates a flow diagram of an example method for configuring a device identifier in accordance with aspects of the present disclosure.

FIG. 5 illustrates a flow diagram of an example method for configuring a device identifier in accordance with aspects of the present disclosure. FIG. 5 may be a scenario in which a computing device is first provisioned to operate. Although described with respect to two communication interfaces, a computing device in accordance with aspects described herein may include more than two communication interfaces and one or more steps of the method of FIG. 5 may be repeated and/or altered accordingly for more communication interfaces. Many of the steps in the method of FIG. 5 may be performed by the computing device 301, 401. Specifically, for example, computer-executable instructions may be configured to implement the steps when executed by processor(s) of the computing device 301, 401. In step 501, plural unique identifiers associated with communication interfaces of a computing device, such as a DVR, may be maintained in a memory. The unique identifiers, communication interfaces, computing device, and memory may be the elements shown in FIG. 3.

Proceeding to step 503, a unique identifier is assigned to a communication interface of the computing device. For example, the computing device may assign a primary or default unique identifier to a first communication interface. The first communication interface also may be a primary or default communication interface that commonly is used for accessing a service provider network. In alternative embodiments, a unique ID of the plurality may be randomly assigned to a communication interface of the computing device. A determination may be made in step 505 as to whether additional communication interfaces exist in the computing device that need a unique ID assigned to it. Such a determination may be for any communication interface not yet assigned a unique ID or only any actively connection/operating communication interface not yet assigned a unique ID. If more communication interfaces need assignment of a unique ID, the process returns to step 503. Else, the process moves to step 507.

In step 507, the computing device may determine which communication interface to use to attempt to access a desired network, e.g., a service provider network, or any location or service on a local network or wide area network. Such a scenario may occur when a first request is sent though a first communication interface, and if the reply received back does not include a code that matches or aligns with a predetermined code, the computing device then sends a second request through a second, different communication interface. In this example of FIG. 5, the computing device will attempt to send separate requests through the communication interfaces at the same time. In step 509, computing device sends a first request through a first communication interface to access the desired service provider network. The first request includes the unique ID that was assigned to the first communication interface in step 503. Similarly in step 511, computing device sends a second request through a second communication interface to access the desired service provider network. The second request includes the unique ID that was assigned to the second communication interface in step 503.

Proceeding to step 513, the computing device may receive one or more replies to the separate requests sent in steps 509 and 511. The computing device determines which communication interface received a code that informs the computing device that it is accessing the desired service provider network. If the determined communication interface from step 513 is the first communication interface in 515, the process ends as the assigned primary or default unique ID of the communication interface used for accessing the desired service provider network is the unique ID that a billing system and/or tracking system of the service provider network can use for assessing access to the desired service provider network by the computing device.

If the first communication interface in step 515 is not the communication interface that received the predetermined code, the process moves to step 517 where the computing device re-assigns the unique ID of the first communication interface to the second communication interface. The unique ID that was assigned to the first communication interface may have been the primary or default unique ID that a billing system and/or tracking system of the service provider network can use for assessing access to the desired service provider network by the computing device. Since the second communication interface received a code that informs the computing device that it is connected to the service provider network, the unique ID that was assigned to the first communication interface is re-assigned to the second communication interface in step 517. Optionally in step 519, the previous unique ID of the second communication interface that was assigned in step 503 may be re-assigned to the first communication interface.

The example of FIG. 5 may be a situation where the computing device enters a state where it needs to provision on the desired service provider network. In such an example, the computing device acquires an IP address and the unique IDs are MAC addresses. The computing device has two communication interfaces that are active and connected to different networks (e.g., Wi-Fi communication interface connected to a WLAN and MoCA communication interface connected to a LAN). The computing device initiates DHCP queries to the respective networks to which the communication interfaces are connected, and it receives a reply from each network. In this example, the MoCA communication interface is connected to the network that provides access to the service provider network. The DHCP reply that the computing device received on the MoCA communication interface may include a code that indicates that the DHCP reply came from the DHCP server that resides on the network that has access to the service provider network. The DHCP reply received on the WLAN does not have a code that matches or aligns with a predetermined code to indicate that the service provider network is connected over the WLAN interface. The computing device then re-assigns the unique IDs. In this example, MAC addresses are re-assigned to ensure that the MoCA communication interface is using the applicable MAC address that is provisioned on the service provider network.

Figure 6:
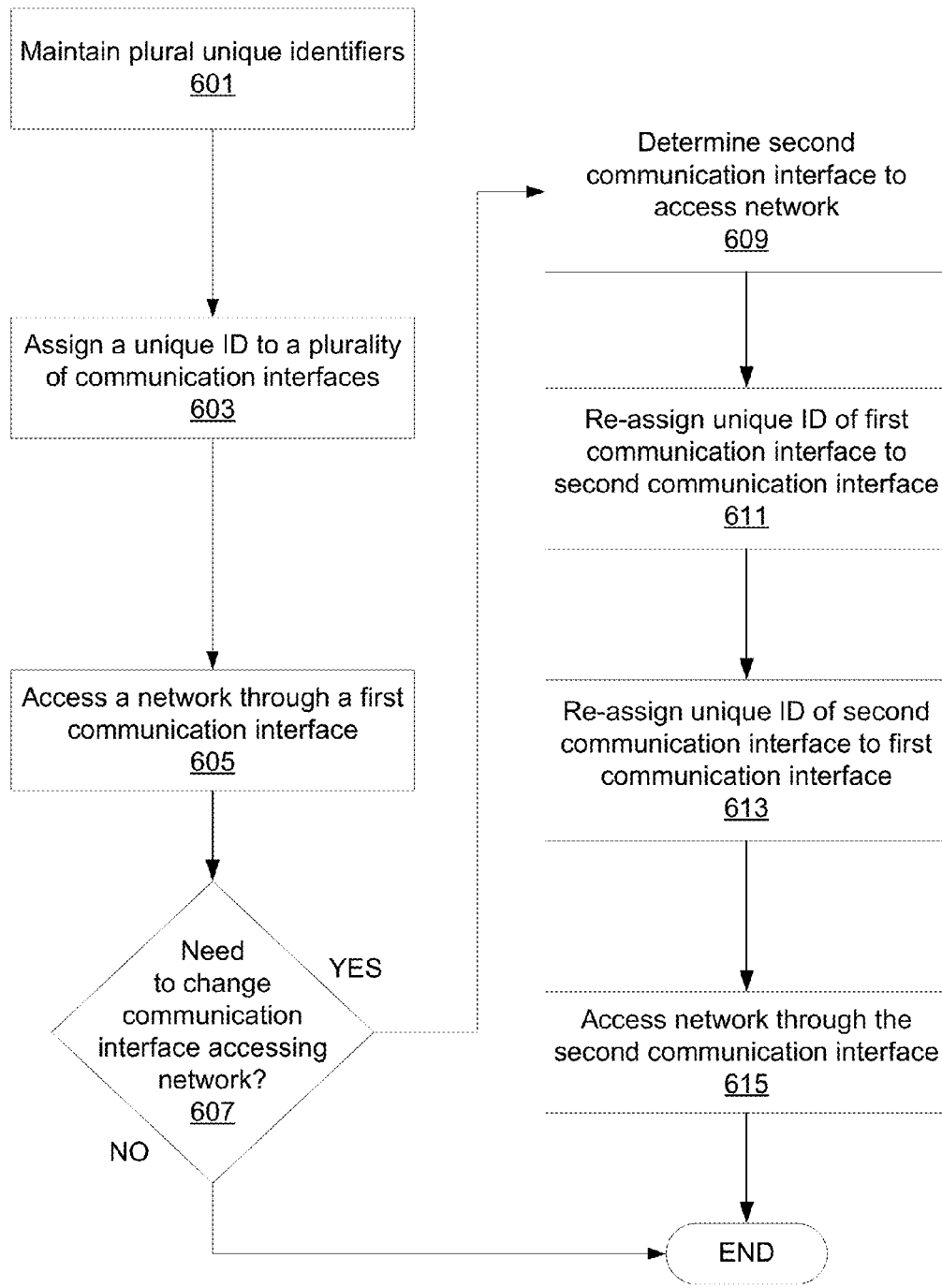
FIG. 6 illustrates a flow diagram of another example method for configuring a device identifier in accordance with aspects of the present disclosure.

FIG. 6 illustrates a flow diagram of another example method for configuring a device identifier in accordance with aspects of the present disclosure. FIG. 6 may be a scenario in which a computing device is in operation and a computing device is accessing a desired service provider network and then a condition occurs requiring change of communication interface for accessing the desired service provider network. Although described with respect to two communication interfaces, a computing device in accordance with aspects described herein may include more than two communication interfaces and one or more steps of the method of FIG. 6 may be repeated and/or altered accordingly for more communication interfaces. Many of the steps in the method of FIG. 6 may be performed by the computing device 301, 401. Specifically, for example, computer-executable instructions may be configured to implement the steps when executed by processor(s) of the computing device 301, 401.

In step 601, plural unique identifiers associated with communication interfaces of a computing device, such as a DVR, are maintained in a memory. The unique identifiers, communication interfaces, computing device, and memory may be the elements shown in FIG. 3. Proceeding to step 603, a unique identifier is assigned to each communication interface of the computing device. For example, the computing device may assign a primary or default unique ID to a first communication interface and a second unique ID to a second communication interface. In step 605, the computing device may access a desired service provider network though the first communication interface. For example, from the process of FIG. 5, the path from step 515 may proceed directly to the end as the first communication interface received the code for accessing the desired service provider network.

In step 607 a determination may be made that a need exists to change the communication interface that is accessing the desired service provider network. One example may be a situation in which the communication interface is a USB type communication interface and a connection to the interface has been removed. Under such a scenario, the link to access the desired service provider network through the USB communication interface has been terminated. If no need exists in step 607, the process may end. Else, if a need does exist, the process proceeds to step 609.

In step 609, the computing device may determine a second communication interface to access the desired service provider network. For example, access to the desired service provider network may exist through the second communication interface, such as a 4GLTE type communication interface. The determination may be made by the computing device sending a request through the second communication network to access the desired service provider network and receiving a reply that includes a code that informs the computing device that it is accessing the desired service provider network.

Moving to step 611, the computing device re-assigns the unique ID of the first communication interface to the second communication interface. The unique ID that was assigned to the first communication interface was the primary or default unique ID that a billing system and/or tracking system of the service provider network uses for assessing access to the desired service provider network by the computing device. Since the second communication interface now can access the desired service provider network, the unique ID that was assigned to the first communication interface is re-assigned to the second communication interface in step 611. Optionally in step 613, the previous unique ID of the second communication interface may be re-assigned to the first communication interface. In step 615, the computing device accesses the desired service provider network though the second communication interface.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
   maintaining a plurality of identifiers for a first interface and a second interface of a computing device based on the first interface and the second interface being connected to a network;
   assigning, by the computing device and to the first interface, a first identifier of the plurality of identifiers;
   causing transmission, via the first interface, of a first request to access a device on the network, the first request comprising the first identifier;
   receiving, by the computing device and from the network and after the causing transmission of the first request, a code;
   determining, based on a comparison of the received code to a first predetermined code associated with the first interface, that the first interface uses a protocol not supported by the device on the network;
   re-assigning, based on the determining that the first interface uses a protocol not supported by the device on the network, the first identifier to the second interface;
   causing transmission, via the second interface and based on the determining that the first interface uses a protocol not supported by the device on the network, of a second request to access the device on the network;
   determining, after the causing transmission of the second request, that the second interface is not connected to the network; and
   removing the first identifier from being assigned to the second interface.

2. The method of claim 1, further comprising, prior to the causing the transmission of the first request, determining to use the first interface in order to access the network.

3. The method of claim 1, wherein the first identifier comprises a media access control (MAC) address.

4. The method of claim 1, further comprising:
   receiving, by the computing device and from the network and after transmission of the second request, a second code;
   determining, based on a comparison of the received second code to a second predetermined code associated with the second interface, that the second interface uses a protocol supported by the device on the network, the second predetermined code being different from the first predetermined code; and
   communicating with the device on the network via the second interface using the first identifier.

5. The method of claim 1, wherein the first interface comprises one of a WiFi communication interface, a Multimedia over Coax (MoCA) communication interface, a Bluetooth communication interface, a Data Over Cable Service Interface Specification (DOCSIS) communication interface, and a 4G communication interface, and the second interface comprises another of the WiFi communication interface, the MoCA communication interface, the Bluetooth communication interface, the DOCSIS communication interface, and the 4G communication interface.

6. The method of claim 1, further comprising:
   determining to access the network via a third interface instead of the first interface; and re-assigning the first identifier to the third interface in response to the determining to access the network via the third interface instead of the first interface.

7. The method of claim 6, further comprising re-assigning, to the first interface, a second identifier previously assigned to the second interface.

8. The method of claim 1, wherein the network is a conditional access system.

9. An apparatus comprising:
one or more processors; and
memory storing instructions that, when executed by the one or more processors, cause the apparatus to:
  maintain a plurality of identifiers for a first interface and a second interface of the apparatus based on the first interface and the second interface being connected to a network;
  assign, to the first interface, a first identifier of the plurality of identifiers;
  cause transmission, via the first interface, of a first request to access a device on the network, the first request comprising the first identifier;
  receive, from the network and after the causing transmission of the first request, a code;
  determine, based on a comparison of the received code to a first predetermined code associated with the first interface, that the first interface uses a protocol not supported by the device on the network;
  re-assign, based on the determining that the first interface uses a protocol not supported by the device on the network, the first identifier to the second interface;
  cause transmission, via the second interface and based on the determining that the first interface uses a protocol not supported by the device on the network, of a second request to access the device on the network;
  determine, after the causing transmission of the second request, that the second interface is not connected to the network; and
  remove the first identifier from being assigned to the second interface.

10. The apparatus of claim 9, wherein the instructions, when executed by the one or more processors, further cause the apparatus to:
  determine, prior to the causing the transmission of the first request, to use the first interface in order to access the network.

11. The apparatus of claim 9, wherein the first identifier comprises a media access control (MAC) address.

12. The apparatus of claim 9, wherein the instructions, when executed by the one or more processors, further cause the apparatus to:
  receive, from the network and after transmission of the second request, a second code;
  determine, based on a comparison of the received second code to a second predetermined code associated with the second interface, that the second interface uses a protocol supported by the device on the network, the second predetermined code being different from the first predetermined code; and
  communicate with the device on the network via the second interface using the first identifier.

13. The apparatus of claim 9, wherein the first interface comprises one of a WiFi communication interface, a Multimedia over Coax (MoCA) communication interface, a Bluetooth communication interface, a Data Over Cable Service Interface Specification (DOCSIS) communication interface, and a 4G communication interface, and the second interface comprises another of the WiFi communication interface, the MoCA communication interface, the Bluetooth communication interface, the DOCSIS communication interface, and the 4G communication interface.

14. The apparatus of claim 9, wherein the instructions, when executed by the one or more processors, further cause the apparatus to:
  determine to access the network via a third interface instead of the first interface; and
  re-assign the first identifier to the third interface in response to the determining to access the network via the third interface instead of the first interface.

15. The apparatus of claim 14, wherein the instructions, when executed by the one or more processors, further cause the apparatus to:
  re-assign, to the first interface, a second identifier previously assigned to the second interface.

16. The apparatus of claim 9, wherein the network is a conditional access system.

17. A system comprising:
a device connected to a network; and
an apparatus comprising:
  one or more processors; and
  memory storing instructions that, when executed by the one or more processors, cause the apparatus to;
  maintain a plurality of identifiers for a first interface and a second interface of the apparatus based on the first interface and the second interface being connected to the network;
  assign, to the first interface, a first identifier of the plurality of identifiers;
  cause transmission, via the first interface, of a first request to access the device on the network, the first request comprising the first identifier;
  receive, from the network and after the causing transmission of the first request, a code;
  determine, based on a comparison of the received code to a first predetermined code associated with the first interface, that the first interface uses a protocol not supported by the device on the network;
  re-assign, based on the determining that the first interface uses a protocol not supported by the device on the network, the first identifier to the second interface;
  cause transmission, via the second interface and based on the determining that the first interface uses a protocol not supported by the device on the network, of a second request to access the device on the network;
  determine, after the causing transmission of the second request, that the second interface is not connected to the network; and
  remove the first identifier from being assigned to the second interface.

18. The system of claim 17, wherein the first identifier comprises a media access control (MAC) address.

19. The system of claim 17, wherein the first interface comprises one of a WiFi communication interface, a Multimedia over Coax (MoCA) communication interface, a Bluetooth communication interface, a Data Over Cable Service Interface Specification (DOCSIS) communication interface, and a 4G communication interface, and the second interface comprises another of the WiFi communication interface, the MoCA communication interface, the Bluetooth communication interface, the DOCSIS communication interface, and the 4G communication interface.

20. The system of claim 17, wherein the network is a conditional access system.

* * * * *

UNITED STATES PATENT AND TRADEMARK OFFICE
CERTIFICATE OF CORRECTION

PATENT NO. : 10,116,754 B2
APPLICATION NO. : 14/168241
DATED : October 30, 2018
INVENTOR(S) : Christopher Stone It is certified that error appears in the above-identified patent and that said Letters Patent is hereby corrected as shown below:

In the Drawings

Sheet 4 of 5, Fig. 4A, Reference Numeral 401, Line 1:
Please delete "Deevice" and insert --Device--

In the Specification

Column 7, Detailed Description, Line 2:
Delete "317" and insert --319--

Column 7, Detailed Description, Line 7:
Delete "802.11 ae" and insert --802.11ae--

Signed and Sealed this
Twenty-sixth Day of February, 2019

Andrei Iancu
*Director of the United States Patent and Trademark Office*